(12) United States Patent
Deneuve et al.

(10) Patent No.: US 11,409,265 B2
(45) Date of Patent: Aug. 9, 2022

(54) METHOD OF SETTING A CONTROLLER WITH SETPOINT WEIGHTING

(71) Applicant: SAFRAN AIRCRAFT ENGINES, Paris (FR)

(72) Inventors: Sébastien Jean Fernand Deneuve, Moissy-Cramayel (FR); Christophe Marc Alexandre Le Brun, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 182 days.

(21) Appl. No.: 16/955,901

(22) PCT Filed: Dec. 20, 2018

(86) PCT No.: PCT/FR2018/053464
§ 371 (c)(1),
(2) Date: Jun. 19, 2020

(87) PCT Pub. No.: WO2019/122755
PCT Pub. Date: Jun. 27, 2019

(65) Prior Publication Data
US 2021/0116886 A1 Apr. 22, 2021

(30) Foreign Application Priority Data

Dec. 20, 2017 (FR) ...................................... 1762660

(51) Int. Cl.
*G05B 19/4155* (2006.01)
(52) U.S. Cl.
CPC .............. *G05B 19/4155* (2013.01); *G05B 2219/34013* (2013.01)
(58) Field of Classification Search
None
See application file for complete search history.

(56) References Cited

U.S. PATENT DOCUMENTS

| | | | | |
|---|---|---|---|---|
| 2007/0268068 A1* | 11/2007 | Yutkowitz | ........... | H02P 23/0077 329/325 |
| 2010/0152868 A1* | 6/2010 | Chen | ...................... | G05B 11/42 700/42 |
| 2010/0185304 A1* | 7/2010 | El-Rifai | ................. | G05B 11/42 700/44 |

FOREIGN PATENT DOCUMENTS

| | | |
|---|---|---|
| DE | 35 06 097 A1 | 8/1986 |
| DE | 37 08 266 A1 | 9/1987 |

OTHER PUBLICATIONS

Rajinikanth et al., "Setpoint weighted PID controller tuning for unstable system using heuristic algorithm", Archives of Control Sciences, vol. 22, No. 4, 2012, pp. 481-505.

(Continued)

*Primary Examiner* — Ryan A Jarrett
(74) *Attorney, Agent, or Firm* — Sughrue Mion, PLLC

(57) ABSTRACT

The invention relates to a method for the closed-loop control of a proportional integral-type controller (2) in an instrumentation and control device (1) of a closed-loop control system (3), in particular a servovalve-actuator system, said controller (2) including a setpoint-weighting coefficient ($\beta$), said closed-loop control method comprising the consecutive steps of assigning (11) a unit value to the set-point weighting coefficient ($\beta$), optimizing (12) a closed-loop control of the controller (2) satisfying at least one predefined performance criterion, defining a characteristic tracking error ($\epsilon TC$) making it possible to respond to the performance constraints of the system to be closed-loop controlled, and assigning (132) a setpoint weighting coefficient ($\beta$) value, depending on the characteristic tracking error ($\epsilon TC$) and the closed-loop control of the controller (2).

10 Claims, 2 Drawing Sheets

(56) References Cited

OTHER PUBLICATIONS

Search Report dated Oct. 12, 2018 by the French Patent Office in application No. 1762660.
International Search Report dated May 16, 2019 by the International Searching Authority in application No. PCT/FR2018/053464.

* cited by examiner

METHOD OF SETTING A CONTROLLER WITH SETPOINT WEIGHTING

CROSS REFERENCE TO RELATED APPLICATIONS

This application is a National Stage of International Application No. PCT/FR2018/053464 filed Dec. 20, 2018, claiming priority based on French Patent Application No. 1762660 filed Dec. 20, 2017, the entire contents of each of which are herein incorporated by reference in their entireties.

GENERAL TECHNICAL FIELD AND PRIOR ART

The invention relates to the general field of servo-controlled systems.

More particularly, it relates to the setting of correctors with command weighting in control-command systems.

It finds application in all types of servo-controlled systems, in particular in the control-command systems of the actuators of a turbomachine, for example actuators servo-controlling parameters such as the pitch angle of the blades, the fuel flow rate or the position of members with variable geometry.

These actuators conventionally include a servo valve-cylinder assembly, the behavior of which is conventionally modeled in the field of servo-control by a second order linear system with an integrator.

This type of operation is translated by the equation below:

$$G_{sys}(s) = \frac{1}{s}\left(\frac{as^2 + bs + c}{\alpha s^2 + \beta s + \gamma}\right)$$

The behavior of command loops is generally specified by a list of requirements of the command system, in particular for criteria of response time, overshoot, stability or static and tracking error.

It is also necessary to ensure the robustness of the command to disturbances (for example a measurement noise or a resistant force occurring during the monitoring of a setpoint) and to modeling uncertainties.

Apart from performance purposes, the command laws must be easily adjustable and of reasonable complexity. Indeed, the command laws are capable of being recalibrated on a test bench if the performances obtained on the real system do not comply with the list of requirements. These differences in behavior can be explained by a poor modeling Gsys of the system. The setting can then be modified by adapting Gsys so that it is more representative of reality.

Finally, gradient limiters are generally applied to the setpoints of the local loops associated with the regulation of the pitch to avoid having too great dynamics (likely to generate over-torques in the propeller shafts). These limiters mean that the fastest setpoints sent to the local loops will have the form of ramps with a known maximum gradient. Setting the correctors knowing the error that will be obtained for these ramp setpoints is therefore a crucial issue.

Given the severe requirements for these local loops, a proportional integral corrector is not always suitable. It is therefore necessary to use more advanced corrector structures which have a greater number of degrees of freedom to meet the needs.

However, the conventional use of a derivative component in regulation can generate unwanted effects, in particular in the case of noise on acquisitions or setpoints varying abruptly.

One solution allowing to have a third degree of freedom in the setting of the corrector without adding a derivative component is to use a PI type corrector with setpoint weighting.

This type of corrector allows modifying the dynamics of tracking of the PI setting while preserving its properties of stability and rejection of disturbances. In particular, this can allow maintaining the speed of the initial PI while reducing the overshoot.

However, unlike the PI corrector where many setting methods exist, the setting of a PI corrector with setpoint weighting is done mainly iteratively on the proportional $K_P$, integral $K_I$ gains and the setpoint weighting coefficient $\beta$. This heuristic method can then prove to be tedious.

GENERAL PRESENTATION OF THE INVENTION

A first purpose of the invention is to overcome the shortcomings of the existing state of the art by providing a method for the automatic setting of a proportional integral-type corrector with setpoint weighting.

Another purpose of the invention is to propose a simple setting method.

Another purpose of the invention is to provide a simple setting structure.

Another purpose of the invention is to minimize the overshoot without degrading the response time.

Another purpose of the invention is to improve the response time and the overshoot without degrading the stability and robustness, in particular the rejection of disturbance.

Another purpose of the invention is to reduce the impact of the measurement noise.

Another purpose of the invention is to optimize the overshoot/tracking error compromise.

It is conventionally understood by tracking error the difference between the setpoint inputted into a controlled system and the response of this system, when the setpoint is of the ramp type. A ramp-type setpoint is conventionally a linear function.

Another purpose of the invention is to estimate and define the expected tracking error from a setting of the corrector.

For this purpose, the invention proposes a method for the setting of a proportional integral-type corrector in a control command device of a servo-controlled system, in particular of a servo valve-cylinder system, the corrector including a setpoint weighting coefficient, a proportional gain and an integral gain, the setting method including the successive steps of:
setting the setpoint weighting coefficient at a unit value,
setting the proportional gain and the integral gain of the corrector meeting at least one predefined performance criterion,
Defining a characteristic tracking error allowing to meet the performance constraints of the servo-controlled system, and
setting the setpoint weighting coefficient at a setpoint weighting coefficient value according to the characteristic tracking error and the proportional gain and the integral gain previously set.

The invention can be optionally but advantageously supplemented by the following characteristics, taken alone or in combination:
- the step of setting the proportional gain and the integral gain of the corrector further comprising the following steps:
  - Determining and setting the proportional and integral gains at initial values,
  - Adjusting by iteration proportional and integral gains, so as to optimize at least one predefined performance criterion;
- the step of determining the initial values of the proportional and integral gains is carried out by an empirical method of Ziegler-Nichols or by an empirical method of Takahashi;
- the method further comprises a step of determining a safety margin, and in which the step of setting the setpoint weighting coefficient is carried out according to the theoretical error of the control command device and the safety margin;
- the safety margin is determined according to the behavioral gap between the real system and its linearized model;
- the corrector includes no derivative component;
- the method is carried out automatically by means of a setting module including one or more memory units, in which setpoints are stored allowing the execution of the automatic setting method, the setpoints being executed by means of at least one processor.

According to a second aspect, the invention also proposes a control command device of a servo-controlled system, in particular of a servo valve-cylinder system, the control command device including a setpoint inputted into a corrector, the output signal of the corrector being inputted into the servo-controlled system, the servo-controlled system producing a response, the response also being inputted into the corrector, in which the corrector is a proportional integral-type corrector comprising a setpoint weighter, the weighter including a setpoint weighting coefficient, the setpoint weighting coefficient of the corrector being defined by means of a setting method according to the invention.

Optionally but advantageously, in such a device the corrector is configured to generate a command corresponding to the sum of:
- The error integrated and modified by an integral gain,
- The difference between a setpoint weighted by the setpoint weighting coefficient and the response of the servo-controlled system, this difference being modified by a proportional gain, wherein the integral gain, the proportional gain and the setpoint weighting coefficient are parameters of the corrector that can be set.

PRESENTATION OF THE FIGURES

Other characteristics and advantages of the invention will emerge from the following description, which is purely illustrative and not limiting, and should be read with reference to the appended figures in which.

DESCRIPTION OF ONE OR MORE EMBODIMENTS

Figure 1:
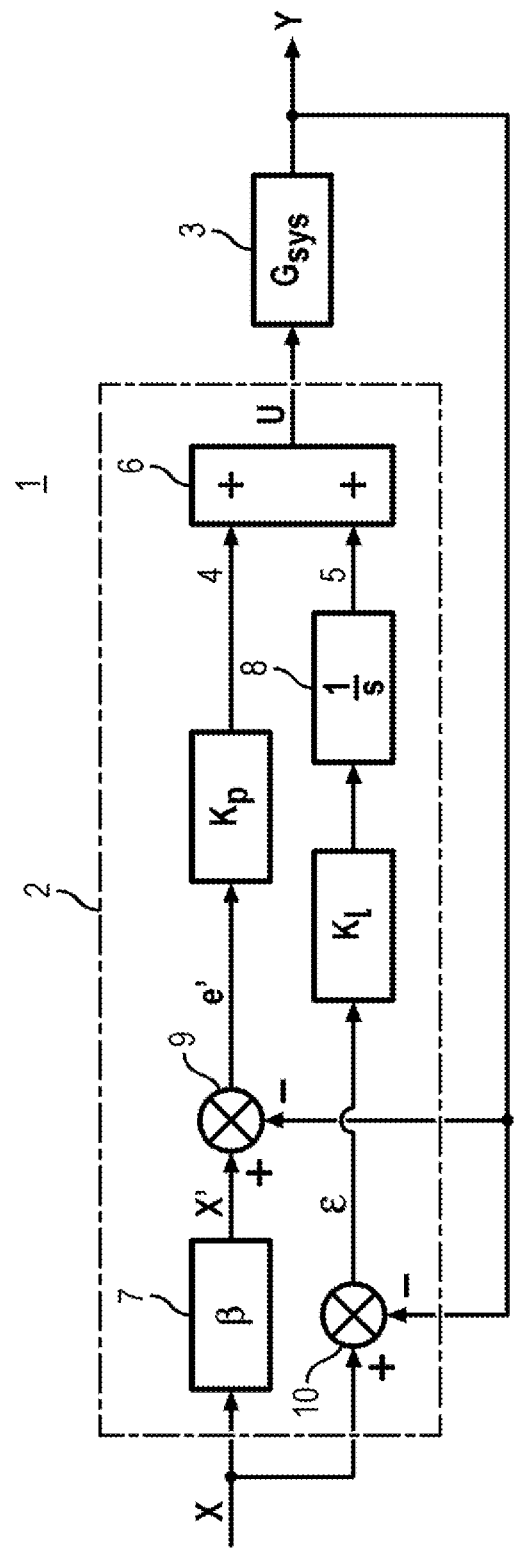
FIG. 1 is a diagram of a servo-control chain according to the invention.

Generalities:

With reference to FIG. 1, a control command chain 1 includes a corrector 2 and a servo-controlled system 3.

In a preferred embodiment, the servo-controlled system 3 includes an integrator.

In the embodiment shown, the corrector 2 is of the proportional integral type with setpoint weighting.

A setpoint X is inputted at the input of the corrector 2, which transforms the setpoint X into a command U, the command U being inputted into the servo-controlled system 3.

The servo-controlled system 3 reacts depending on the command U received, the response Y of the servo-controlled system being measured and returned to the corrector 2.

More specifically, the corrector 2 performs a proportional action 4 and an integral action 5 in parallel, which are inputted into an adder 6.

The adder 6 thus generates the command U, which is inputted into the servo-controlled system 3.

The setpoint X and the response Y are both inputted into each of the proportional 4 and integral 5 action chains.

The proportional action 4 receives as input the setpoint X, which is inputted into a weighter 7 so as to generate a weighted setpoint X'.

The weighter 7 applies a gain, or a setpoint weighting coefficient $\beta$, to the setpoint X.

The weighted setpoint X' and the response Y are inputted into a subtractor 9, generating a weighted error e', that is to say the difference between the weighted setpoint X' and the response Y.

The weighted error e' is inputted into a proportional gain $K_P$, then into the adder 6.

The integral action 5 receives as input the setpoint X, which is inputted into a subtractor 10 with the response Y, generating an error $\varepsilon$ corresponding to the difference between the setpoint X and the response Y.

In this specific case, the error E is a tracking error $\varepsilon_T$, the setpoint X being of the ramp type.

The error $\varepsilon$ is then inputted into an integral gain $K_I$, then into an integrator block 8. The output of the integrator 8 is inputted into the adder 6.

It is possible in other embodiments that the weighter 7 is located on the integral action 5, or upstream of the corrector, or that each of the proportional 4 and integral 5 actions includes a weighter 7 each having a weighting coefficient setpoint p, these coefficients being mutually different.

Corrector Setting:

As is well known, the dimensioning of the proportional $K_P$ and integral $K_I$ gains has an impact on the stability, the response time and the robustness of the control chain 1.

The setting of the degrees of freedom of the corrector 2 allows optimizing the criteria of stability, response time and robustness of the system, as well as minimizing the overshoot and the tracking error.

Figure 2:
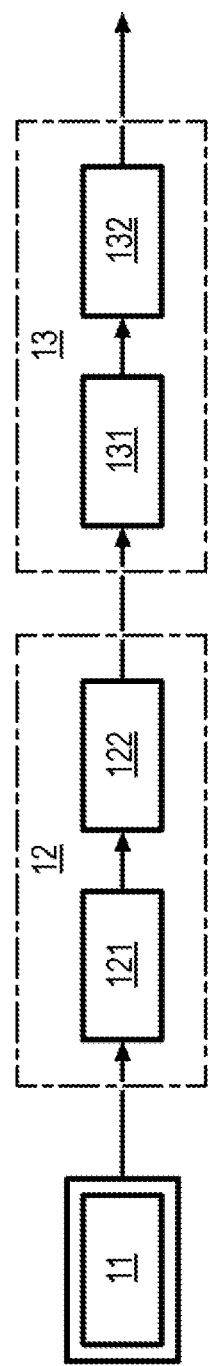
FIG. 2 is a diagram detailing a method for the automatic setting of a corrector according to the invention.
Figure 3:
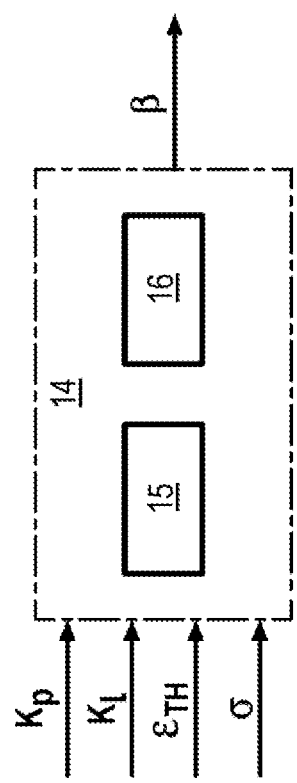
FIG. 3 shows a setting module allowing to carry out a method in accordance with the invention.

A method for the automatic setting of these parameters includes a plurality of steps carried out sequentially. This method is illustrated in FIG. 2.

An assignment step 11 is performed firstly, during which the setpoint weighting coefficient $\beta$ is fixed at a unit value. In this way, the corrector has a behavior of a conventional proportional integral corrector.

An optimization step 12 is then carried out, during which a setting of the corrector 2 is carried out so as to optimize at least one performance criterion, which can be selected from, for example, robustness, response time, overshoot, or any other criterion or combination of criteria allowing to quantify the performances and the behavior of a servo-controlled system.

During a determination step 121, initial values are determined and assigned to the proportional gain $K_P$ and to the integral gain $K_I$.

This is a first setting of the corrector 2, achievable by a conventional setting method such as for example an empirical method of Ziegler Nichols or Takahashi, as described below.

During the determination step 121 according to the Takahashi method, the gain margin of the system to be regulated is estimated by increasing the gain until a self-sustaining oscillating system is obtained.

Initial proportional and integral gain values are then defined according to the gain margin values given by the Takahashi method (correspondence table available in the literature).

Any other conventional corrector setting method can be used to carry out this step, the choice of another method being able to lead to a determination of the initial values of proportional and integral gains according to a criterion other than the gain margin, such as for example the overshoot or the response time.

The initial values of the proportional gain $K_P$ and of the integral gain $K_I$ are then refined during an adjustment step 122.

During the adjustment step 122, the proportional gain $K_P$ and integral gain $K_I$ values are refined by iteration, so as to comply with the requirements of stability, response time and robustness which are stipulated by the list of requirements of the control command chain 1. The value of the gains is increased or decreased until a setting which gives satisfactory results in simulation is obtained.

Once the optimal proportional gain $K_P$ and integral gain $K_I$ values obtained, they are fixed, and a weighting setting step 13 is then carried out.

By applying the final value theorem to a system such as a control command chain 1, the setpoint weighting coefficient β can be expressed by the relation:

$$\beta = 1 - \varepsilon \times \frac{K_I}{K_P}$$

In the embodiment described, the setpoint weighting coefficient β is therefore a function of the proportional gain $K_P$ and of the integral gain $K_I$, as well as of the system error ε.

The proportional gain $K_P$ and the integral gain $K_I$ being fixed, it is therefore possible to calibrate the value of the setpoint weighting coefficient β so as to reach an error value E corresponding to the criteria of the list of requirements defining the performance to be achieved for the control command chain 1.

In order to obtain a behavior that complies with the criteria specified by the list of requirements, it is necessary to dimension the setting of the corrector for the most unfavorable operating cases.

The most unfavorable operating cases are encountered in the case where the setpoints have the largest gradient.

The setpoint gradient limitations imply that the most demanding setpoints will have the form of ramps with a gradient equal to that of the gradient limiter.

Consequently, the type of error that will be used to size the corrector will be a tracking error, corresponding to the error following the most demanding setpoint model (a ramp).

Prior to the weighting assignment step 132, a modeling step 131 can be carried out, during which the servo-controlled system 3 is assimilated to a theoretical model 3' representing its operation.

In the selected embodiment, the servo-controlled system model 3' is a perfect second order linear system associated with an integrator, subjected to a ramp-type setpoint of unit slope. It may for example include an actuator of the servo valve-cylinder type.

The command chain 1 is therefore modeled by a command chain model 1' including a corrector model 2' similar to the corrector 2 and the servo-controlled system model 3'.

During the modeling step 131, the corrector model 2' has the settings established during the assignment 11 and optimization 12 steps.

The setpoint weighting coefficient β is fixed at a unit value, the proportional $K_P$ and integral $K_I$ gains are fixed at the values obtained after the optimization step 12.

A theoretical error $\varepsilon_{TH}$ of the command chain model 1' can be deduced conventionally, which will then be used in order to proceed with the setting of the setpoint coefficient β.

The theoretical error $\varepsilon_{TH}$ can also be a specification of the list of requirements and be extracted directly from the list of requirements.

However, it is possible in other embodiments to apply a setpoint on a ramp with a non-unit slope.

In the selected embodiment of a ramp setpoint, the theoretical error of the model is therefore a characteristic tracking error $\varepsilon_{TC}$.

The setpoint weighting coefficient β can therefore be defined during the weighting assignment step 132 for a value expressed according to the formula:

$$\beta = 1 - (\varepsilon_{TC}) \times \frac{K_I}{K_P}$$

The value thus expressed will be assigned to the weighter 7 of the control chain 1.

Under the effect of the setting of the value of the setpoint weighting coefficient β, the command chain 1 will have a tracking error ET which will tend to the value of the characteristic tracking error $\varepsilon_{TC}$.

Optionally, the theoretical error $\varepsilon_{TH}$ can be associated with a safety margin σ defined so as to take into account the non-linearity of the operation of the servo-controlled system 3. It is necessary to take into account its imperfections in the synthesis of the corrector 2. The setpoint weighting coefficient β is then defined according to the formula:

$$\beta = 1 - (\varepsilon_{TH} + \sigma) \times \frac{K_I}{K_P}$$

In the embodiment where the servo-controlled system 3 is modeled as a perfect second order linear system with an integrator subjected to a ramp setpoint, the setpoint weighting coefficient β can then be defined by the relation:

$$\beta = 1 - (\varepsilon_{TC} + \sigma) \times \frac{K_I}{K_P}$$

The structure of this embodiment of the corrector 2 allows modifying the setpoint weighting coefficient β without having any effect on the performance in terms of stability and robustness of the corrector 2.

The optimal setting of the setpoint weighting coefficient β allows optimizing the response time, the overshoot and the tracking error $\varepsilon_T$, more specifically it allows defining the performance expected for the tracking error $\varepsilon_T$ without degrading the performance in response time and overshoot matter previously obtained by the proportional $K_P$ and integral $K_I$ gain setting.

More particularly, the overshoot is highly contained while retaining a response time similar to a corrector 2 without weighter 7.

In this embodiment, the corrector 2 preserves its properties of stability and robustness with or without a weighter 7.

By avoiding adding a derivative component, the sensitivity of the system to measurement noise is greatly limited.

Taking into account the theoretical error $\varepsilon_{TH}$ in the setting of the corrector 2 allows obtaining an optimal overshoot/error $\varepsilon$ compromise compared to the specifications of the list of requirements.

In the embodiment in which the servo-controlled system 3 is modeled as a perfect second order linear system with an integrator subjected to a ramp setpoint, taking into account the characteristic tracking error $\varepsilon_{TC}$ in the setting of the corrector 2 allows obtaining an optimal overshoot/tracking error $\varepsilon_T$ compromise compared to the specifications of the list of requirements.

The automated setting method allows greatly limiting the duration of the operation, in addition to simplifying the process.

The structure of the setting is simple, which limits its development and maintainability costs.

The automatic setting method of the corrector 2 is carried out by means of a setting unit or module 14 including one or more memory units 15, in which setpoints are stored allowing the execution of the automatic setting method.

The setpoints are executed by means of at least one processor 16, which implements the automatic setting method of the corrector 2. The processor 16 and the memory 15 are typically part of the engine computer, but it is alternatively possible that they are integrated into a specific module physically separate from the engine control unit.

Similarly, if there is an existing setting of a PI corrector with setpoint weighting for an integrator system, then it is possible to know the tracking error that we will be obtained, for a ramp setpoint, thanks to the relation:

$$\varepsilon_T = \frac{K_p}{K_I}(1-\beta)$$

Now, knowledge of the servo-control performance and therefore of the tracking error ET is essential for the design of the fallback modes of the turbomachine.

When a fault is detected on the machine, a fallback must be carried out quickly to preserve the machine by avoiding keeping it for too long in a degraded state.

Conversely, a too rapid reduction in the propeller speed relative to the power delivered by the gas generator is also dangerous because it may cause additional torques in the propeller shafts.

Knowing the profile of decelerations in advance via knowledge of the tracking error $\varepsilon_T$ therefore allows optimizing the design of the propellers, whether from the point of view of piloting (synchronization between the propellers and the gas generator) or the mechanical design since the torques that will be present in the propeller shafts during rapid transients can be known in advance.

The invention claimed is:

1. A method for controlling a control command device of a servo-controlled system, the method comprising:
setting of a proportional integral-type corrector in the control command device, the proportional integral-type corrector including a setpoint weighting coefficient, a proportional gain and an integral gain,
the method including the successive steps of:
setting the setpoint weighting coefficient at a unit value,
setting the proportional gain and the integral gain of the corrector meeting at least one predefined performance criterion,
defining a characteristic tracking error allowing to meet performance constraints of the servo-controlled system,
setting the setpoint weighting coefficient at a setpoint weighting coefficient value according to the characteristic tracking error and the proportional gain and the integral gain previously set, and
controlling the control command device based on the setpoint weighting coefficient.

2. The method according to claim 1, wherein the step of setting the proportional gain and the integral gain of the corrector further comprises the following steps:
determining and setting the proportional and integral gains at initial values, and
adjusting by iteration proportional and integral gains, so as to optimize at least one predefined performance criterion.

3. The method according to claim 2, wherein the step of determining the initial values of the proportional and integral gains is carried out by an empirical method of Ziegler-Nichols or by an empirical method of Takahashi.

4. The method according to claim 1, further comprising a step of determining a safety margin, and wherein the step of setting the setpoint weighting coefficient at the setpoint weighting coefficient value is carried out according to a theoretical error of the command control device and the safety margin.

5. The method according to claim 4, wherein the safety margin is determined according to the behavioral gap between the real system and its linearized model.

6. The method according to claim 1, wherein the corrector includes no derivative component.

7. The method according to claim 1, the method being carried out automatically by means of a setting module including one or more memory units, in which setpoints are stored allowing the execution of the automatic setting method, the setpoints being executed by means of at least one processor.

8. The method according to claim 1, wherein the servo-controlled system is a servo valve-cylinder system.

9. A control command device of a servo-controlled system, the control command device including a setpoint inputted into a corrector, an output signal of the corrector being inputted into the servo-controlled system, the servo-controlled system producing a response, the response also being inputted into the corrector, in which the corrector is a proportional integral-type corrector comprising a setpoint weighter, the setpoint weighter including a setpoint weighting coefficient, the control command device comprising at least one processor configured to at least:
set the setpoint weighting coefficient at a unit value,
set the proportional gain and the integral gain of the corrector meeting at least one predefined performance criterion, define a characteristic tracking error allowing to meet the performance constraints of the servo-controlled system, set the setpoint weighting coefficient at a setpoint weighting coefficient value according to the characteristic tracking error and the proportional gain and the integral gain previously set, and control the control command device based on the setpoint weighting coefficient.

10. The command device according to claim 9, wherein the corrector is configured to generate a command corresponding to the sum of:

the error integrated and modified by an integral gain, the difference between a weighted setpoint weighted by the setpoint weighting coefficient and the response of the servo-controlled system, the difference being modified by a proportional gain, wherein the integral gain, the proportional gain and the setpoint weighting coefficient are parameters of the corrector that can be set.

* * * * *